United States Patent
Quinn et al.

(10) Patent No.: US 12,432,227 B2
(45) Date of Patent: Sep. 30, 2025

(54) ENCRYPTION DETECTION

(71) Applicant: Dell Products L.P., Round Rock, TX (US)

(72) Inventors: Brett Quinn, Cotuit, MA (US); Doug Lecrone, Hopkinton, MA (US); Paul Linstead, Shrewsbury, MA (US); Denis Burt, Plymouth, MA (US)

(73) Assignee: Dell Products L.P., Round Rock, TX (US)

( * ) Notice: Subject to any disclaimer, the term of this patent is extended or adjusted under 35 U.S.C. 154(b) by 209 days.

(21) Appl. No.: 18/230,346

(22) Filed: Aug. 4, 2023

(65) Prior Publication Data

US 2025/0047688 A1 Feb. 6, 2025

(51) Int. Cl.
*H04L 9/40* (2022.01)

(52) U.S. Cl.
CPC .............. *H04L 63/1416* (2013.01)

(58) Field of Classification Search
CPC ................................ H04L 63/1416
See application file for complete search history.

(56) References Cited

U.S. PATENT DOCUMENTS

| | | | |
|---|---|---|---|
| 9,692,784 B1* | 6/2017 | Nenov | H04L 63/1416 |
| 2016/0197951 A1* | 7/2016 | Lietz | H04L 63/0227 726/23 |
| 2017/0206158 A1* | 7/2017 | Brown | G06F 12/023 |
| 2018/0034849 A1* | 2/2018 | Huston, III | H04L 63/0236 |
| 2018/0288099 A1* | 10/2018 | Rubakha | H04L 63/145 |
| 2018/0324146 A1* | 11/2018 | Meriac | H04W 4/80 |

* cited by examiner

*Primary Examiner* — Abdulkader M Alriyashi
(74) *Attorney, Agent, or Firm* — Krishnendu Gupta; Nikhil Patel

(57) ABSTRACT

One or more aspects of the present disclosure relate to protecting the integrity of datasets stored by a storage array. In embodiments, one or more IO write requests from an input/output (IO) workload are intercepted. Additionally, a likely cyber-attack event is identified based on a bit density of write data corresponding to the one or more IO requests. Further, the cyber-attack event is mitigated.

14 Claims, 4 Drawing Sheets

ENCRYPTION DETECTION

BACKGROUND

A storage array performs block-based, file-based, or object-based storage services. Rather than store data on a server, storage arrays can include multiple storage devices (e.g., drives) to store vast amounts of data. For example, a financial institution can use storage arrays to collect and store financial transactions from local banks and automated teller machines (ATMs) related to, e.g., bank account deposits/withdrawals. In addition, storage arrays can include a central management system (CMS) that manages the data and delivers one or more distributed storage services for an organization. The central management system can include one or more processors that perform data storage services.

SUMMARY

One or more aspects of the present disclosure relate to protecting the integrity of datasets stored by a storage array. In embodiments, one or more IO write requests from an input/output (IO) workload are intercepted. Additionally, a likely cyber-attack event is identified based on a bit density of write data corresponding to the one or more IO requests. Further, the cyber-attack event is mitigated.

In embodiments, requests to access a logical device or its corresponding tracks can be identified. For example, the requests can correspond to IO messages of the IO workload. Additionally, an access rate of the logical device or its corresponding tracks during a time window can be determined.

In embodiments, one or more access request patterns can be identified based on current and historical access requests.

In embodiments, an access bitmap for each logical device track can be established.

In embodiments, the access rate of the logical device can be determined based on each access bitmap corresponding to the logical device's tracks during the time interval. Further, a comparison of the access rate during the time interval with an anticipated access rate defined by the access request patterns for the time interval can be performed.

In embodiments, an increase in the access rate during the time interval can be identified based on the comparison.

In embodiments, an occurrence of the abnormal access to the logical device can be identified if the increase of the access rate during the time interval exceeds a threshold access rate increase.

In embodiments, a bit density of write data corresponding to the one or more IO write requests can be determined.

In embodiments, an entropy score for the bit density of the write data can be established.

In embodiments, whether the entropy score exceeds a threshold entropy score can be determined.

Other technical features may be readily apparent to one skilled in the art from the following figures, descriptions, and claims.

BRIEF DESCRIPTION OF THE DRAWINGS

The preceding and other objects, features, and advantages will be apparent from the following more particular description of the embodiments, as illustrated in the accompanying drawings. Like reference characters refer to the same parts throughout the different views. The drawings are not necessarily to scale, emphasis instead being placed upon illustrating the embodiments' principles.

DETAILED DESCRIPTION

A business like a financial or technology corporation can produce large amounts of data and require sharing access to that data among several employees. Such a business often uses storage arrays to store and manage the data. Because a storage array can include multiple storage devices (e.g., hard-disk drives (HDDs) or solid-state drives (SSDs)), the business can scale (e.g., increase or decrease) and manage an array's storage capacity more efficiently than a server. In addition, the business can use a storage array to read/write data required by one or more business applications.

Unfortunately, a storage array can experience cyber-attacks, including data theft, destruction, or encryption. Specifically, malicious actors can launch these attacks from nefarious code inserted in application libraries and hold data for ransom. Further, the nefarious code can lie dormant for long periods before becoming active, making them challenging to detect. For example, malicious actors can use encryption-related cyber-attacks to encrypt and overwrite data, enabling them to hold the data for ransom. Current naïve host-based techniques periodically mine data access request logs to detect cyber-attacks. Thus, the current naïve host-based techniques can only detect attacks after they have occurred.

Embodiments of the present disclosure protect dataset integrity by identifying, e.g., encryption-related cyber-attacks in real-time. For example, the embodiments can intercept IO write requests from an IO workload. Based on a bit density of data corresponding to the IO write requests, the embodiments can identify and mitigate a cyber-attack as described in greater detail herein.

Figure 1:
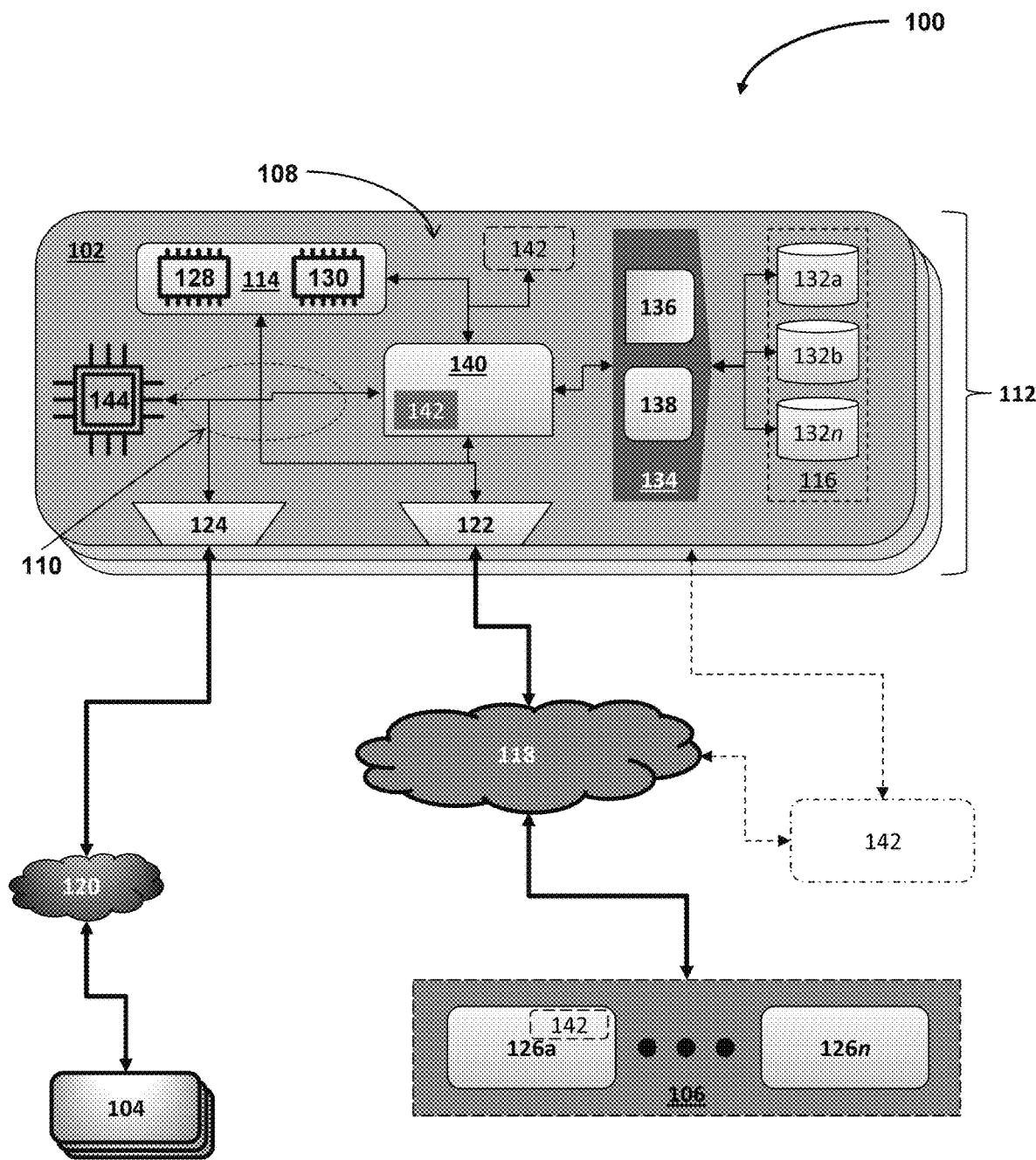
FIG. 1 illustrates a distributed network environment in accordance with embodiments of the present disclosure.

Regarding FIG. 1, a distributed network environment 100 can include a storage array 102, a remote system 104, and hosts 106. In embodiments, the storage array 102 can include components 108 that perform one or more distributed file storage services. In addition, the storage array 102 can include one or more internal communication channels 110 like Fibre channels, busses, and communication modules that communicatively couple the components 108. Further, the distributed network environment 100 can define an array cluster 112, including the storage array 102 and one or more other storage arrays.

In embodiments, the storage array 102, components 108, and remote system 104 can include a variety of proprietary or commercially available single or multi-processor systems (e.g., parallel processor systems). Single or multi-processor systems can include central processing units (CPUs), graphical processing units (GPUs), and the like. Additionally, the storage array 102, remote system 104, and hosts 106 can virtualize one or more of their respective physical computing resources (e.g., processors (not shown), memory 114, and persistent storage 116).

In embodiments, the storage array 102 and, e.g., one or more hosts 106 (e.g., networked devices) can establish a network 118. Similarly, the storage array 102 and a remote system 104 can establish a remote network 120. Further, the network 118 or the remote network 120 can have a network architecture that enables networked devices to send/receive electronic communications using a communications protocol. For example, the network architecture can define a storage area network (SAN), local area network (LAN), wide area network (WAN) (e.g., the Internet), an Explicit Congestion Notification (ECN), Enabled Ethernet network, and the like. Additionally, the communications protocol can include a Remote Direct Memory Access (RDMA), TCP, IP, TCP/IP protocol, SCSI, Fibre Channel, Remote Direct Memory Access (RDMA) over Converged Ethernet (ROCE) protocol, Internet Small Computer Systems Interface (iSCSI) protocol, NVMe-over-fabrics protocol (e.g., NVMe-over-ROCEv2 and NVMe-over-TCP), and the like.

Further, the storage array 102 can connect to the network 118 or remote network 120 using one or more network interfaces. The network interface can include a wired/wireless connection interface, bus, data link, and the like. For example, a host adapter (HA 122), e.g., a Fibre Channel Adapter (FA) and the like, can connect the storage array 102 to the network 118 (e.g., SAN). Further, the HA 122 can receive and direct IOs to one or more of the storage array's components 108, as described in greater detail herein.

Likewise, a remote adapter (RA 124) can connect the storage array 102 to the remote network 120. Further, the network 118 and remote network 120 can include communication mediums and nodes that link the networked devices. For example, communication mediums can include cables, telephone lines, radio waves, satellites, infrared light beams, etc. The communication nodes can also include switching equipment, phone lines, repeaters, multiplexers, and satellites. Further, the network 118 or remote network 120 can include a network bridge that enables cross-network communications between, e.g., the network 118 and remote network 120.

In embodiments, hosts 106 connected to the network 118 can include client machines 126*a-n*, running one or more applications. The applications can require one or more of the storage array's services. Accordingly, each application can send one or more input/output (IO) messages (e.g., a read/write request or other storage service-related request) to the storage array 102 over the network 118. Further, the IO messages can include metadata defining performance requirements according to a service level agreement (SLA) between hosts 106 and the storage array provider.

In embodiments, the storage array 102 can include a memory 114, such as volatile or nonvolatile memory. Further, volatile and nonvolatile memory can include random access memory (RAM), dynamic RAM (DRAM), static RAM (SRAM), and the like. Moreover, each memory type can have distinct performance characteristics (e.g., speed corresponding to reading/writing data). For instance, the types of memory can include register, shared, constant, user-defined, and the like. Furthermore, in embodiments, the memory 114 can include global memory (GM 128) that can cache IO messages and their respective data payloads. Additionally, the memory 114 can include local memory (LM 130) that stores instructions that the storage array's processors 144 can execute to perform one or more storage-related services. For example, the storage array 102 can have a multi-processor architecture that includes one or more CPUs (central processing units) and GPUs (graphical processing units).

In addition, the storage array 102 can deliver its distributed storage services using persistent storage 116. For example, the persistent storage 116 can include multiple thin-data devices (TDATs) such as persistent storage drives 132*a-n*. Further, each TDAT can have distinct performance capabilities (e.g., read/write speeds) like hard disk drives (HDDs) and solid-state drives (SSDs).

Further, the HA 122 can direct one or more IOs to an array component 108 based on their respective request types and metadata. In embodiments, the storage array 102 can include a device interface (DI 134) that manages access to the array's persistent storage 116. For example, the DI 134 can include a disk adapter (DA 136) (e.g., storage device controller), flash drive interface 138, and the like that control access to the array's persistent storage 116 (e.g., storage devices 132*a-n*).

Likewise, the storage array 102 can include an Enginuity Data Services processor (EDS 140) that can manage access to the array's memory 114. Further, the EDS 140 can perform one or more memory and storage self-optimizing operations (e.g., one or more machine learning techniques) that enable fast data access. Specifically, the operations can implement techniques that deliver performance, resource availability, data integrity services, and the like based on the SLA and the performance characteristics (e.g., read/write times) of the array's memory 114 and persistent storage 116. For example, the EDS 140 can deliver hosts 106 (e.g., client machines 126*a-n*) remote/distributed storage services by virtualizing the storage array's memory/storage resources (memory 114 and persistent storage 116, respectively).

In embodiments, the storage array 102 can also include a controller 142 (e.g., management system controller) that can reside externally from or within the storage array 102 and one or more of its components 108. When external from the storage array 102, the controller 142 can communicate with the storage array 102 using any known communication connections. For example, the communications connections can include a serial port, parallel port, network interface card (e.g., Ethernet), etc. Further, the controller 142 can include logic/circuitry that performs one or more storage-related services. For example, the controller 142 can have an architecture designed to manage the storage array's computing, processing, storage, and memory resources as described in greater detail herein.

Figure 2:
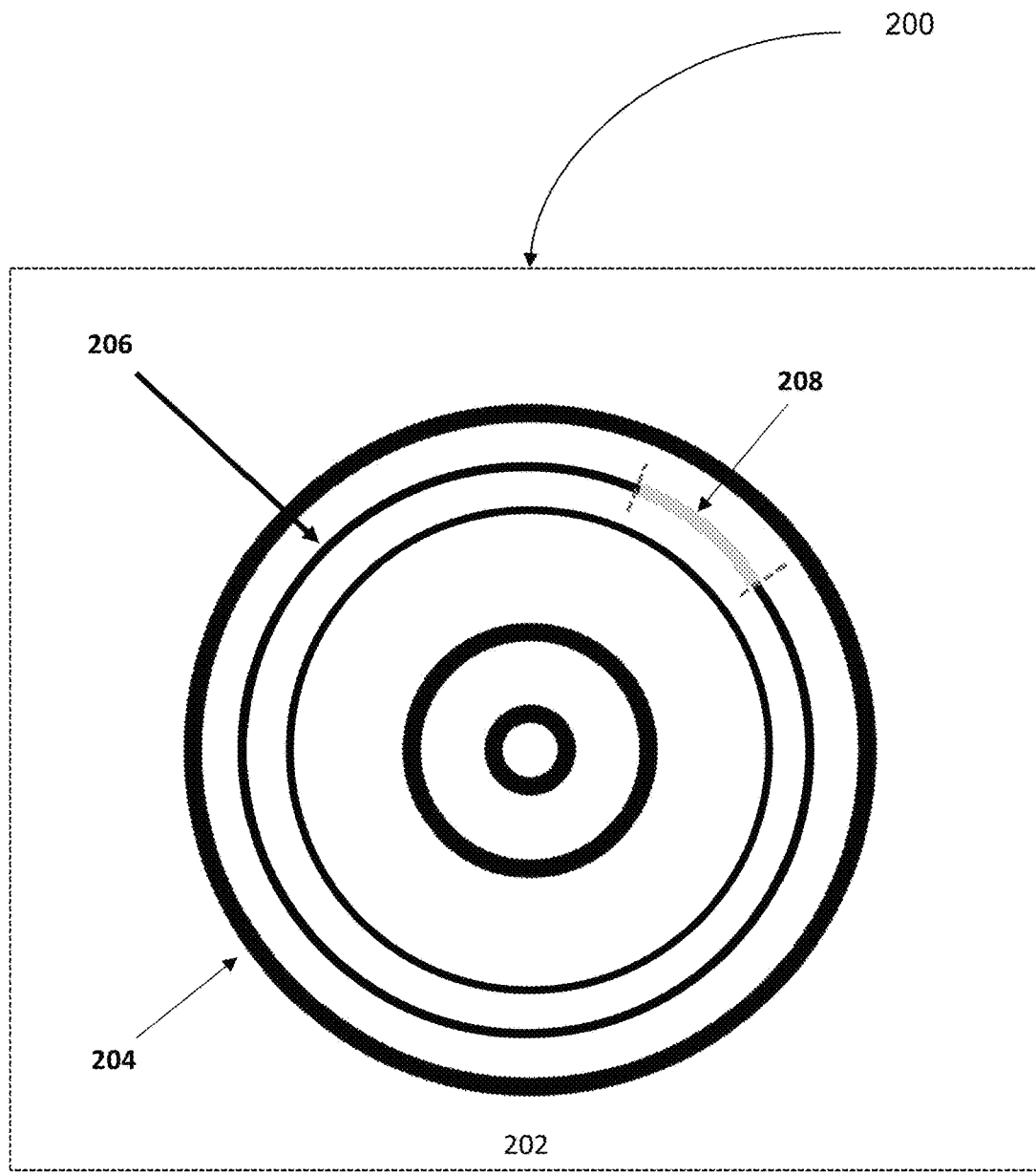
FIG. 2 is a cross-sectional view of a storage device in accordance with embodiments of the present disclosure.

Regarding FIG. 2, the storage array 102 can provide a host, e.g., client machine 126*a* of FIG. 1, with a logical device (e.g., virtual or thin device (TDEV)). The logical device can represent or virtualize zero or more physical address spaces from, e.g., the persistent storage 116 of FIG. 1. For example, the persistent storage 116 can include an HDD 202 with stacks of cylinders 204. Like a vinyl record's grooves, each cylinder 204 can include one or more tracks 206. Further, each track 206 can include several sectors (e.g., track slices or portions) 208. Additionally, each sector 208 can include a set of physical address blocks.

In embodiments, a data services engine (e.g., the EDS 140 of FIG. 1) can establish a logical block address (LBA) corresponding to each physical address block. Accordingly, a continuous set of LBAs can form a logical sector corresponding to a physical sector (e.g., sector 208) of a storage device 132*a-n*. Further, the data services engine can group several logical sectors to establish a logical track. Thus, a logical track can include physical address blocks from several storage devices 132*a-n*. Each logical track can also include a unique identifier (ID), e.g., a track ID (TID). Thus, the data services engine can establish a logical device with a unique device ID by logically grouping one or more logical tracks using their respective TIDs. Furthermore, the data services engine can logically group a logical device's tracks to establish one or more extents with unique extent IDs.

As stated herein, the storage devices 126 can have distinct performance capabilities. For example, an HDD architecture is known by skilled artisans to be slower than an SSD's architecture. Likewise, the array's memory 114 can include different memory types, each with distinct performance characteristics described herein. In embodiments, the EDS 108 can establish a storage or memory hierarchy based on the SLA and the performance characteristics of the array's memory/storage resources. For example, the SLA can include one or more Service Level Objectives (SLOs) specifying performance metric ranges (e.g., response times and uptimes) corresponding to the hosts' performance requirements.

Further, the SLO can specify service level (SL) tiers corresponding to each performance metric range and categories of data importance (e.g., critical, high, medium, low). For example, the SLA can map critical data types to an SL tier requiring the fastest response time. Thus, the storage array 102 can allocate the array's memory/storage resources based on an IO workload's anticipated volume of IO messages associated with each SL tier and the memory hierarchy.

For example, the EDS 108 can establish the hierarchy to include one or more tiers (e.g., subsets of the array's storage and memory) with similar performance capabilities (e.g., response times and uptimes). Thus, the EDS 108 can establish fast memory and storage tiers to service host-identified critical and valuable data (e.g., Platinum, Diamond, and Gold SLs). In contrast, slow memory and storage tiers can service host-identified, non-critical, less valuable data (e.g., Silver and Bronze SLs). The EDS 108 can also define "fast" and "slow" performance metrics based on relative performance measurements of the array's memory 114 and storage devices 126. Thus, the fast tiers can include memory 114 and storage devices 126 with relative performance capabilities exceeding a first threshold. In contrast, slower tiers can include memory 114 and storage devices 126, with relative performance capabilities falling below a second threshold. In embodiments, the first and second thresholds can have substantially similar values.

Figure 3:
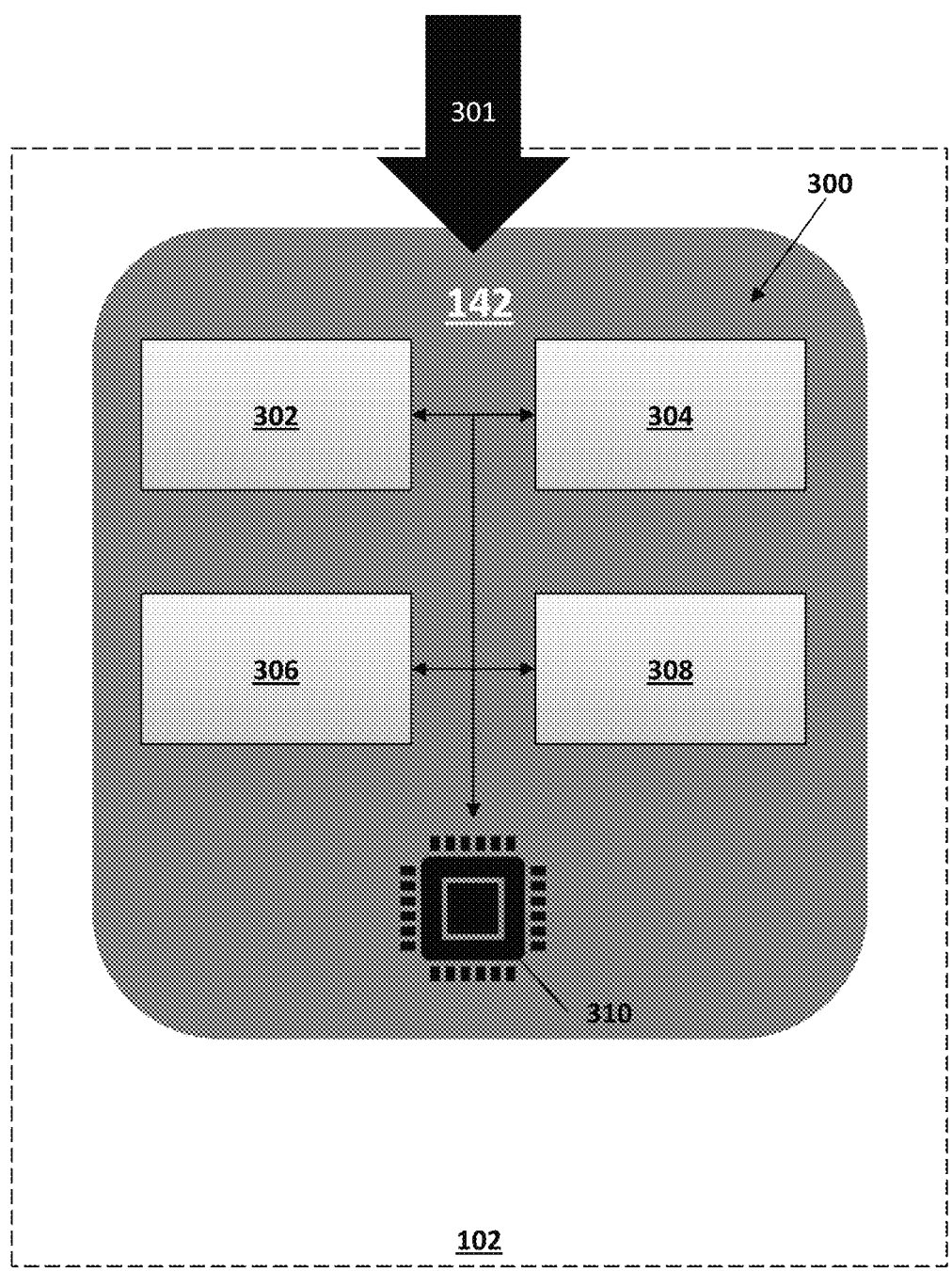
FIG. 3 is a block diagram of a controller in accordance with embodiments of the present disclosure.

Regarding FIG. 3, a storage array 102 can include a controller 142 with logic, hardware, and circuitry 300 that perform one or more data storage services. For example, the controller 142 can process an input/output (IO) workload 301 received by the storage array 102.

In embodiments, the controller 142 can include an IO processor 302 that monitors and analyzes the IO workload 301 and its corresponding IO messages (e.g., IO read/write requests). For example, the IO processor 302 can determine the IO characteristics of the IO workload 301 and its IO messages using metadata from IO messages. The characteristics include IO type, size, read/write ratio, access patterns, etc. Further, the IO processor 302 can identify patterns in IO characteristics using the metadata from current and historical IO workloads and their corresponding IO messages. For example, the IO processor 302 can include logic, hardware, and circuitry (not shown) with a neural self-learning learning architecture that processes the current and historical IO metadata. In a local memory 310 and using the patterns, the IO processor 302 can maintain IO workload models defining IO characteristics of one or more anticipated IO workloads and their corresponding IO messages. Accordingly, the IO workload models can predict access rates corresponding to logical devices and their corresponding tracks targeted by IO messages of anticipated IO workloads.

In embodiments, the controller 142 can include a scheduler 304 with logic, hardware, and circuitry configured to maintain, e.g., at least one data access schedule in the local memory 310. For instance, the scheduler 304 can generate a data access schedule for each IO workload defined by each IO workload model. The data access schedule can define time windows during which one or more logical devices or one or more of their tracks should be inaccessible or have restricted access. Such time windows can correspond to data backup, migration, etc.

Further, the scheduler 304 can select the logical devices or their corresponding tracks that should be inaccessible or have restricted access based on their respective service levels (SLs) (e.g., those with an SL above a threshold SL). For example, the scheduler 304 can establish a data protection bitmap for each track of each logical device and store them in the local memory 310. For the selected tracks that should have restricted access during a given time window, the scheduler 304 can set a bit in their corresponding bitmaps. Accordingly, the scheduler 304 can establish restricted access policies defining tracks of logical devices that should have restricted access or be inaccessible during one or more time windows. Further, the scheduler 301 can store the restricted access policies in the local memory 310.

In embodiments, the controller 142 can include an IO interceptor 306 with logic, hardware, and circuitry configured to intercept IO write requests from the IO workload 301. Additionally, the IO interceptor 306 can determine a bit density of data corresponding to each IO write request. Further, the IO interceptor 306 can map the bit densities to corresponding target logical devices and tracks during one or more time windows. Using a machine learning (ML) technique, the IO interceptor 306 can identify patterns corresponding to bit densities for each time window. Based on the patterns, the IO interceptor 306 can further generate bit density models predicting bit density for write data targeting a logical device and its tracks.

In embodiments, the controller 142 can also include a storage analyzer 306 with logic, hardware, and circuitry that monitors requests to access one or more logical devices or their corresponding tracks. For example, the storage analyzer 306 can track requests to access a logical device or its corresponding tracks during a current time window. For example, the storage analyzer 306 can establish an access bitmap for the logical device or its corresponding tracks. In response to an IO message in the IO workload 301 requesting access to the logical device or one or more of its tracks, the storage analyzer 306 can set a bit in the bitmap corresponding to the logical device's track. Accordingly, the storage analyzer 306 can determine the access request rate of the logical device using the bitmaps of the logical device's corresponding tracks.

Further, the storage analyzer 306 can compare the access request rate of the logical device or its tracks during the current time window with the access request rates predicted by a corresponding IO workload model. Based on the comparison, the storage analyzer 306 can identify an anomaly in the access request rate. Additionally, the storage analyzer 306 can reset each bitmap at the start of a next time window.

In embodiments, the controller 142 can include an access manager 308 with logic, hardware, and circuitry configured to control requests to access each track of each logical device. For example, if the access rate of a logical device or at least one of its tracks exceeds the threshold access rate, the access manager 308 can infer that a cyber-attack is likely in progress. In response to inferring a likely cyber-attack, the access manager can determine a bit density of write data corresponding to each intercepted IO write request targeting the logical device or its tracks. Further, the access manager 308 can generate an entropy score for the write data based on a comparison of the bit density and corresponding historical bit densities or an anticipated bit density defined by the bit density model. For example, the access manager 308 can perform a Shannon entropy analysis to generate the entropy score.

If the entropy score exceeds a threshold entropy, the access manager 308 can perform a cyber-attack mitigation action. For example, the access manager 308 can reject the IO write request. In other examples, the access manager 308 can preserve the write data in a location other than the logical device or its tracks for later analysis and reject the IO write request. In another example, the access manager 308 can backup data currently stored in the logical device and its tracks targeted by the IO write request in another location and process the IO write request.

The following text includes details of a method(s) or a flow diagram(s) per embodiments of this disclosure. For simplicity of explanation, each method is depicted and described as a set of alterable operations. Additionally, one or more operations can be performed in parallel, concurrently, or in a different sequence. Further, not all the illustrated operations are required to implement each method described by this disclosure.

Figure 4:
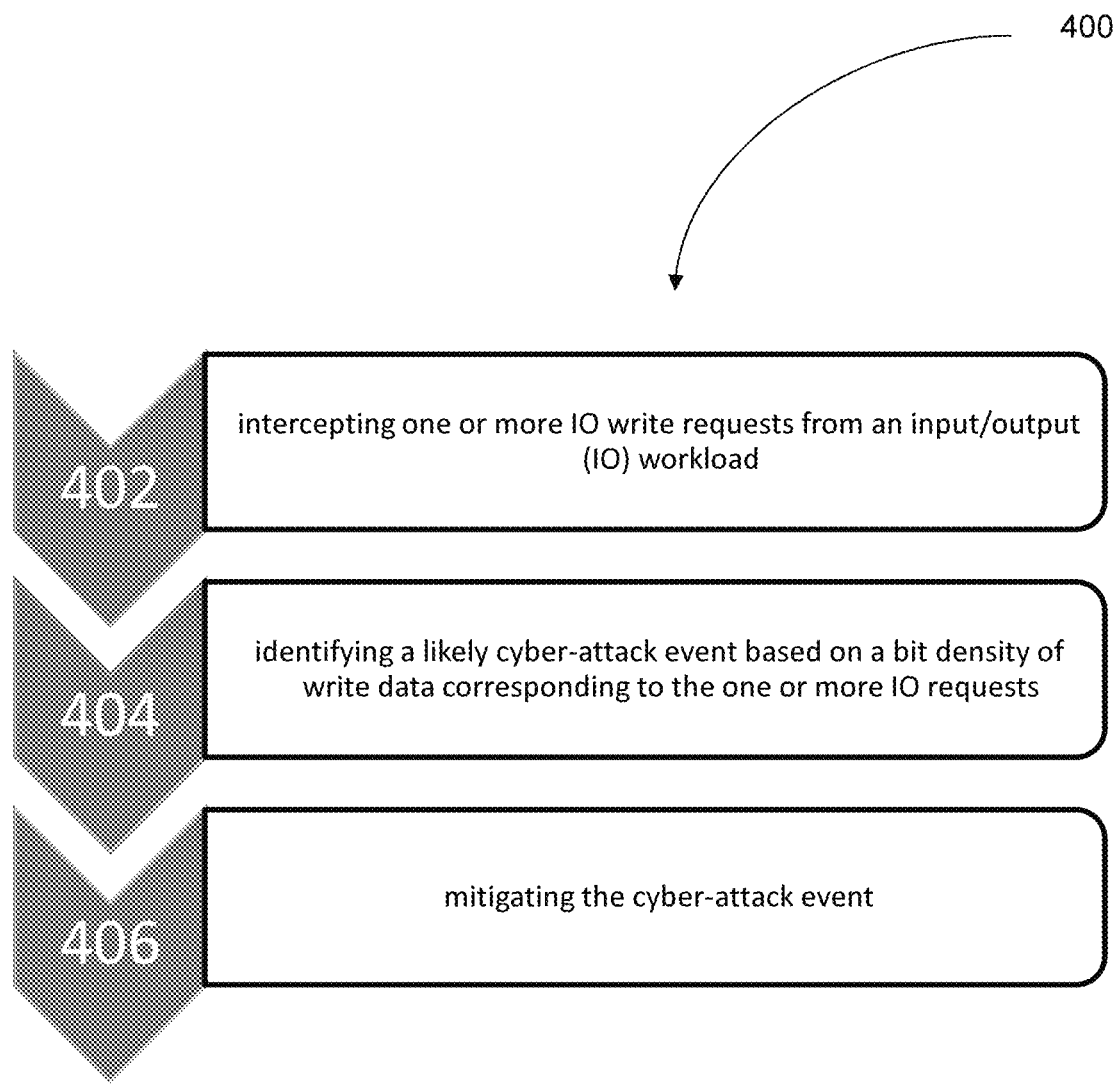
FIG. 4 is a flow diagram of a method for protecting the integrity of datasets stored by a storage array per embodiments of the present disclosure.

Regarding FIG. 4, a method 400 relates to protecting the integrity of datasets stored by a storage array. In embodiments, the controller 142 of FIG. 1 can perform all or a subset of operations corresponding to the method 400.

For example, the method 400, at 402, can include intercepting one or more IO write requests from an input/output (IO) workload. Additionally, at 404, the method 400 can include identifying a likely cyber-attack event based on a bit density of write data corresponding to the one or more IO requests. Further, the method 400, at 406, can include mitigating the cyber-attack event.

Further, each operation can include any combination of techniques implemented by the embodiments described herein. Additionally, one or more of the storage array's components 108 can implement one or more of the operations of each method described above.

Using the teachings disclosed herein, a skilled artisan can implement the above-described systems and methods in digital electronic circuitry, computer hardware, firmware, or software. The implementation can be a computer program product. Additionally, the implementation can include a machine-readable storage device for execution by or to control the operation of a data processing apparatus. The implementation can, for example, be a programmable processor, a computer, or multiple computers.

A computer program can be in any programming language, including compiled or interpreted languages. The computer program can have any deployed form, including a stand-alone program, subroutine, element, or other units suitable for a computing environment. One or more computers can execute a deployed computer program.

One or more programmable processors can perform the method steps by executing a computer program to perform the concepts described herein by operating on input data and generating output. An apparatus can also perform the method steps. The apparatus can be a special-purpose logic circuitry. For example, the circuitry is an FPGA (field-programmable gate array) or an ASIC (application-specific integrated circuit). Subroutines and software agents can refer to portions of the computer program, the processor, the special circuitry, software, or hardware that implements that functionality.

Processors suitable for executing a computer program include, by way of example, both general and special purpose microprocessors and any one or more processors of any digital computer. A processor can receive instructions and data from a read-only memory, a random-access memory, or both. Thus, for example, a computer's essential elements are a processor for executing instructions and one or more memory devices for storing instructions and data. Additionally, a computer can receive data from or transfer data to one or more mass storage device(s) for storing data (e.g., magnetic, magneto-optical disks, solid-state drives (SSDs, or optical disks).

Data transmission and instructions can also occur over a communications network. Information carriers that embody computer program instructions and data include all nonvolatile memory forms, including semiconductor memory devices. The information carriers can, for example, be EPROM, EEPROM, flash memory devices, magnetic disks, internal hard disks, removable disks, magneto-optical disks, CD-ROM, or DVD-ROM disks. In addition, the processor and the memory can be supplemented by or incorporated into special-purpose logic circuitry.

A computer with a display device enabling user interaction can implement the above-described techniques, such as a display, keyboard, mouse, or any other input/output peripheral. The display device can, for example, be a cathode ray tube (CRT) or a liquid crystal display (LCD) monitor. The user can provide input to the computer (e.g., interact with a user interface element). In addition, other kinds of devices can enable user interaction. Other devices can, for example, be feedback provided to the user in any form of sensory feedback (e.g., visual feedback, auditory feedback, or tactile feedback). For example, input from the user can be in any form, including acoustic, speech, or tactile input.

A distributed computing system with a back-end component can also implement the above-described techniques. The back-end component can, for example, be a data server, a middleware component, or an application server. Further, a distributing computing system with a front-end component can implement the above-described techniques. The front-end component can, for example, be a client computer having a graphical user interface, a Web browser through which a user can interact with an example implementation or other graphical user interfaces for a transmitting device. Finally, the system's components can interconnect using any form or medium of digital data communication (e.g., a communication network). Examples of communication network(s) include a local area network (LAN), a wide area network (WAN), the Internet, a wired network(s), or a wireless network(s).

The system can include a client(s) and server(s). The client and server (e.g., a remote server) can interact through a communication network. For example, a client-and-server relationship can arise by computer programs running on the respective computers and having a client-server relationship. Further, the system can include a storage array(s) that delivers distributed storage services to the client(s) or server(s).

Packet-based network(s) can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network(s), 802.16 network(s), general packet radio service (GPRS) network, HiperLAN), or other packet-based networks. Circuit-based network(s) can include, for example, a public switched telephone network (PSTN), a private branch exchange (PBX), a wireless network, or other circuit-based networks. Finally, wireless network(s) can include RAN, Bluetooth, code-division multiple access (CDMA) networks, time division multiple access (TDMA) networks, and global systems for mobile communications (GSM) networks.

The transmitting device can include, for example, a computer, a computer with a browser device, a telephone, an IP phone, a mobile device (e.g., cellular phone, personal digital assistant (PDA) device, laptop computer, electronic mail device), or other communication devices. The browser device includes, for example, a computer (e.g., desktop computer, laptop computer) with a world wide web browser (e.g., Microsoft® Internet Explorer® and Mozilla®). The mobile computing device includes, for example, a Blackberry®.

Comprise, include, or plural forms of each are open-ended, include the listed parts, and contain additional unlisted elements. Unless explicitly disclaimed, the term 'or' is open-ended and includes one or more of the listed parts, items, elements, and combinations thereof.

What is claimed is:

1. A method comprising:
    intercepting one or more input/output (IO) write requests from an IO workload;
    identifying a likely cyber-attack event based on a bit density of write data corresponding to the one or more IO requests;
    identifying requests to access a logical device or corresponding tracks of the logical device, wherein the identified requests correspond to IO messages of the IO workload;
    establishing an access bitmap for each track of the logical device;
    determining an access rate of the logical device based on each access bitmap corresponding to the tracks of the logical device during a time window;
    performing a comparison of the determined access rate during the time window with an anticipated access rate defined by access request patterns for the time window; and
    mitigating the cyber-attack event.

2. The method of claim 1, further comprising: identifying one or more access request patterns based on current and historical access requests.

3. The method of claim 2, further comprising: based on the comparison, identifying an increase in the determined access rate during the time.

4. The method of claim 3, further comprising:
    identifying an occurrence of an abnormal access to the logical device if the increase of the determined access rate during the time window exceeds a threshold access rate increase.

5. The method of claim 4, further comprising:
    determining the bit density of write data corresponding to the one or more IO write requests.

6. The method of claim 5, further comprising:
    establishing an entropy score for the bit density of the write data.

7. The method of claim 6, further comprising:
    determining whether the entropy score exceeds a threshold entropy score.

8. An apparatus with a memory and processor, the apparatus configured to:
    intercept one or more input/output (IO) write requests from an IO workload;
    identify a likely cyber-attack event based on a bit density of write data corresponding to the one or more IO requests;
    identify requests to access a logical device or corresponding tracks of the logical device, wherein the identified requests correspond to IO messages of the IO workload;
    establish an access bitmap for each track of the logical device;
    determine an access rate of the logical device based on each access bitmap corresponding to the tracks of the logical device during a time window;
    perform a comparison of the determined access rate during the time window with an anticipated access rate defined by access request patterns for the time window; and
    mitigate the cyber-attack event.

9. The apparatus of claim 8, further configured to: identify one or more access request patterns based on current and historical access requests.

10. The apparatus of claim 9, further configured to: based on the comparison, identify an increase in the determined access rate during the time window.

11. The apparatus of claim 10, further configured to: identify an occurrence of an abnormal access to the logical device if the increase of the determined access rate during the time window exceeds a threshold access rate increase.

12. The apparatus of claim 11, further configured to: determine the bit density of write data corresponding to the one or more IO write requests.

13. The apparatus of claim 12, further configured to:
    establish an entropy score for the bit density of the write data.

14. The apparatus of claim 13, further configured to:
    determine whether the entropy score exceeds a threshold entropy score.

* * * * *